United States Patent
Kitahata et al.

(10) Patent No.: US 9,586,580 B2
(45) Date of Patent: Mar. 7, 2017

(54) CONTROL DEVICE FOR VEHICLE

(75) Inventors: Takeshi Kitahata, Toyota (JP); Atsushi Tabata, Okazaki (JP); Tooru Matsubara, Toyota (JP); Tatsuya Imamura, Okazaki (JP); Yuji Iwase, Mishima (JP); Tomohito Ono, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 316 days.

(21) Appl. No.: 14/367,358

(22) PCT Filed: Dec. 24, 2011

(86) PCT No.: PCT/JP2011/079952
§ 371 (c)(1),
(2), (4) Date: Jun. 20, 2014

(87) PCT Pub. No.: WO2013/094076
PCT Pub. Date: Jun. 27, 2013

(65) Prior Publication Data
US 2015/0006007 A1    Jan. 1, 2015

(51) Int. Cl.
*B60W 20/50*    (2016.01)
*B60W 20/00*    (2016.01)
(Continued)

(52) U.S. Cl.
CPC ............. *B60W 20/50* (2013.01); *B60K 6/442* (2013.01); *B60K 6/445* (2013.01); *B60K 6/48* (2013.01); *B60K 6/54* (2013.01); *B60W 10/06* (2013.01); *B60W 10/08* (2013.01); *B60W 10/10* (2013.01); *B60W 10/26* (2013.01); *B60W 20/00* (2013.01);
(Continued)

(58) Field of Classification Search
CPC .............. H02J 2007/0067; H02J 7/00; H02M 2001/322; B60Y 2306/01
See application file for complete search history.

(56) References Cited

U.S. PATENT DOCUMENTS

| | | | |
|---|---|---|---|
| 2007/0228822 A1* | 10/2007 | Hirata | B60K 6/48 303/151 |
| 2010/0235029 A1 | 9/2010 | Becker et al. | |
| 2012/0028757 A1* | 2/2012 | Kimura | B60K 6/365 477/5 |

FOREIGN PATENT DOCUMENTS

| JP | 2005-020952 A | 1/2005 |
|---|---|---|
| JP | 2008-265598 A | 11/2008 |
| JP | 2010-242967 A | 10/2010 |

* cited by examiner

*Primary Examiner* — Thomas G Black
*Assistant Examiner* — Ana Thomas
(74) *Attorney, Agent, or Firm* — Andrews Kurth Kenyon LLP (57) ABSTRACT

A control device of a vehicle including an engine, an electric motor directly or indirectly coupled to the engine, and an engagement device non-rotatably fixing the engine, the vehicle further including an electric circuit controlling giving/receiving of electric power related to operation of the electric motor and having an electric storage member temporarily storing the electric power, if the vehicle is damaged, or if a damage of the vehicle is predicted, during rotating operation of the engine, a rotation speed of the engine being reduced by an engagement actuation of the engagement device, and after the rotation speed of the engine is reduced to be equal to or less than a predetermined rotation speed, electric power stored in the electric storage member being discharged by the electric circuit and the electric motor.

4 Claims, 7 Drawing Sheets

(51) Int. Cl.
*B60K 6/442* (2007.10)
*B60K 6/445* (2007.10)
*B60K 6/48* (2007.10)
*B60K 6/54* (2007.10)
*B60W 10/06* (2006.01)
*B60W 10/08* (2006.01)
*B60W 10/26* (2006.01)
*B60W 10/10* (2012.01)
*B60K 6/38* (2007.10)

(52) U.S. Cl.
CPC .............. *B60K 2006/381* (2013.01); *B60W 2710/0644* (2013.01); *Y02T 10/6221* (2013.01); *Y02T 10/6234* (2013.01); *Y02T 10/6239* (2013.01); *Y02T 10/6286* (2013.01); *Y02T 10/84* (2013.01); *Y10S 903/93* (2013.01)

FIG.8A
CONFIGURATION

FIG.8B
RUNNING MODE

| | ENGINE | MG1 | MG2 | CLUTCH C1 | CLUTCH C2 | BRAKE B |
|---|---|---|---|---|---|---|
| MOTOR RUNNING | STOP | FREE | POWER RUNNING | RELEASED (INTERRUPTED) | RELEASED | ENGAGED (FIXED) |
| SERIES HYBRID | OPERATION | ELECTRIC GENERATION (REGENERATION) | POWER RUNNING | ENGAGED (COUPLED) | RELEASED | ENGAGED |
| PARALLEL HYBRID 1 | OPERATION | FREE | POWER RUNNING | ENGAGED | ENGAGED | RELEASED |
| PARALLEL HYBRID 2 | OPERATION | ELECTRIC GENERATION | POWER RUNNING | ENGAGED | ENGAGED | RELEASED |

CONTROL DEVICE FOR VEHICLE

CROSS-REFERENCE TO RELATED APPLICATION

This is a national phase application based on the PCT International Patent Application No. PCT/JP2011/079952 filed Dec. 24, 2011, the entire contents Of which are incorporated herein by reference.

TECHNICAL FIELD

The present invention relates to a control device of a vehicle including an engine and an electric motor coupled to the engine and particularly to a technique of dealing with occurrence of damage of a vehicle during rotating operation of the engine.

BACKGROUND ART

A vehicle is well-known that includes an engine, an electric motor coupled to the engine, and an engagement device non-rotatably fixing the engine. For example, a vehicle described in Patent Document 1 includes an engine, an electric motor coupled via a differential mechanism to the engine, and a clutch selectively coupling a crankshaft of the engine to a non-rotating member to non-rotatably fix the engine. In a vehicle including an electric motor, electric power is given/received between, for example, the electric motor and an electric storage device (e.g., a secondary cell or a battery) via an electric circuit (e.g., an inverter unit). Because of high voltage between the electric storage device or a voltage of an electric storage member (e.g., an inverter capacitor such as an input capacitor, a filter capacitor, or a smoothing capacitor) in the electric circuit, various techniques have been proposed for further improving safety when the vehicle is damaged.

For example, in a technique (discharge control of a capacitor) proposed in Patent Document 2, if a collision of a vehicle is predicted, a relay disposed in an electric path between a battery and an inverter unit is opened and a switching operation of a switching element disposed on an inverter portion of the inverter unit is controlled to discharge high-voltage electric power stored in an inverter capacitor so as not to generate a torque in an electric motor. In a technique proposed in Patent Document 3, when a vehicle collides, fuel supply is terminated to stop an engine and an electric motor is coupled to the fuel-cut engine to stop rotation of the electric motor, thereby preventing the electric motor from operating as an electric generator.

PRIOR ART DOCUMENTS

Patent Documents

Patent Document 1: Japanese Laid-Open Patent Publication No. 2008-265598
Patent Document 2: Japanese Laid-Open Patent Publication No. 2005-20952
Patent Document 3: Japanese Laid-Open Patent Publication No. 2010-242967

SUMMARY OF THE INVENTION

Problem to be Solved by the Invention

In the vehicle including the engine and the electric motor described above, in the case of damage of the vehicle (vehicle body) during rotating operation of the engine (in an operating state of the engine), inertia energy making rotation continue is present in the engine and, therefore, even if fuel cut is performed, a rotation speed of the engine (engine rotation speed) does not immediately decrease. Therefore, the electric motor continues generating electricity until the engine stops rotating and a longer time may be required for completing the discharge of electric power of an inverter capacitor as compared to the case that the rotation of the engine is stopped from the start. If the inertia energy of the engine is consumed by increasing an electric loss in the electric motor or is consumed by advancing switching in an inverter portion, heat generation in a heavy current system (the electric motor, the inverter portion) may increase. If electricity is discharged with the heat generation suppressed, a longer time may be required for completing the discharge. The problem described above is unknown and much room for improvement is left for shortening a discharge time of an electric storage member in the case of damage of the vehicle during the rotating operation of the engine. The case of damage of the vehicle refers to the case that the vehicle is damaged due to a collision between vehicles, a collision with or interference from a barrier around a vehicle, a damage due to a fall of a vehicle itself from a road, a damage of a vehicle due to a falling object onto the vehicle, a damage of a vehicle due to collapse of an object onto the vehicle, etc. and includes the case that a damage of a vehicle is predicted.

The present invention was conceived in view of the situations and it is therefore an object of the present invention to provide a control device of a vehicle capable of shortening a discharge time of an electric storage member storing electric power related to operation of an electric motor in the case of damage of a vehicle during rotating operation of an engine.

Means for Solving the Problem

To achieve the object, the first aspect of the invention provides a control device of a vehicle (a) including an engine, an electric motor directly or indirectly coupled to the engine, and an engagement device non-rotatably fixing the engine, wherein (b) if the vehicle is damaged, or if a damage of the vehicle is predicted, during rotating operation of the engine, a rotation speed of the engine is reduced by an engagement actuation of the engagement device.

Effects of the Invention

Consequently, in the case of damage of the vehicle, energy (inertia energy) accumulated in inertia of the engine is consumed by the engagement actuation of the engagement device and, therefore, the engine rotation speed can be reduced earlier as compared to when the engine rotation speed is passively reduced by performing fuel cut of the engine. As a result, a rotation speed of the electric motor (electric motor rotation speed) coupled to the engine also can be reduced promptly. Therefore, the electric generation of the electric motor can further be suppressed and a discharge time of the electric storage member storing electric power related to operation of the electric motor can be shortened in the case of damage of the vehicle during the rotating operation of the engine.

The second aspect of the invention provides the control device of a vehicle recited in the first aspect of the invention, wherein the vehicle further includes an electric circuit controlling giving/receiving of electric power related to operation of the electric motor and having an electric storage member temporarily storing the electric power, and wherein after the rotation speed of the engine is reduced, to be equal to or less than a predetermined rotation speed, electric power stored in the electric storage member is discharged by the electric circuit and the electric motor. Consequently, since the inertia energy of the engine is consumed by the engagement actuation of the engagement device, the inertia energy to be consumed by a heavy current system (the electric motor, the electric circuit) is accordingly reduced and, therefore, the heat generation of the heavy current system is suppressed and the discharge time of the electric storage member can be shortened.

The third aspect of the invention provides the control device of a vehicle recited in the second aspect of the invention, wherein after the engine is non-rotatably fixed by engagement of the engagement device, the electric power stored in the electric storage member is discharged. Since this eliminates the need for consuming the inertia energy of the engine by the heavy current system, the discharge time of the electric storage member can further be shortened.

The fourth aspect of the invention provides the control device of a vehicle recited in any one of the first to third aspects of the invention, wherein the vehicle further includes an automatic transmission making up a portion of a power transmission path between the electric motor and drive wheels, and wherein if the vehicle is damaged or if a damage of the vehicle is predicted, a tie-up increasing a rotation load of a rotating member of the automatic transmission is generated to reduce a rotation speed of the electric motor. Consequently since the inertia energy of the engine is consumed by the engagement actuation of the engagement device and the inertia energy of the electric motor is additionally consumed by the tie-up of the automatic transmission, the engine rotation speed and the electric motor rotation speed are reduced early. As a result, in the case of damage of the vehicle during the rotating operation of the engine, the discharge time of the electric storage member can further be shortened. Particularly, for the vehicle having the engine and the electric motor coupled indirectly, it is useful to consume the inertia energy of the electric motor by the tie-up of the automatic transmission.

MODE FOR CARRYING OUT THE INVENTION

In the preset invention, preferably, the vehicle may be a hybrid vehicle capable of performing engine running for running with at least the engine used as a drive force source for running and motor running for running with only the electric motor used as the drive force source for running, and a so-called plug-in hybrid vehicle that is the hybrid vehicle in which an electric storage device (such as a battery) mounted on the vehicle is chargeable from a charging stand, a household power source, etc.

Preferably, the vehicle includes a first electric motor and a second electric motor as the electric motor and a differential mechanism having a rotating element coupled to the first electric motor, a rotating element that is an output rotating member coupled to drive wheels in a power transmittable manner, and a rotating element selectively coupled to a non-rotating member by engagement actuation of the engagement device. Therefore, in this vehicle, an engine and an electric motor are indirectly coupled. The second electric motor is coupled to the drive wheels in a power transmittable manner. A crankshaft of the engine is coupled to the rotating element selectively coupled to the non-rotating member. During the motor running, the vehicle configured as described above can use output torque from the first electric motor and that of the second electric motor together for running with the engagement device engaged to fix the crankshaft to the non-rotating member. If the vehicle configured as described above is a plug-in hybrid vehicle, the maximum input/output allowable value of the electric storage device is considered to be made larger than the case of the hybrid vehicle. Therefore, the motor running can be performed in a range covering a higher request drive torque, for example. In this case, the electric motors can be restrained from increasing in size by employing a form including the engagement device so that the first electric motor and the second electric motor can be used as the drive force source for running rather than making the second electric motor larger, for example. Therefore, the engagement device is more useful for the plug-in hybrid vehicle. The present invention is applicable to a vehicle employing the engagement device.

Alternatively, for example, the vehicle may be a vehicle in the form having the electric motor directly coupled to a crankshaft of the engine with the crankshaft or an output shaft of the electric motor selectively coupled to a non-rotating member by the engagement actuation of the engagement device. Such a form is also applicable to a vehicle having the engine and the electric motor coupled to rotating elements of the differential mechanism. For example, the form is applicable to a vehicle having the engine and the first electric motor coupled to one of the three rotating elements of the differential mechanism and the second electric motor coupled to another one rotating element while the remaining one rotating element acts as an output rotating member.

Alternatively, for example, the vehicle may be a vehicle in the form having the engine and the electric motor coupled via a connecting/disconnecting clutch with the crankshaft or the output shaft of the electric motor selectively coupled to a non-rotating member by the engagement actuation of the engagement device. In such a vehicle, the motor running is performed with the connecting/disconnecting clutch released, while the engine running is performed with the connecting/disconnecting clutch engaged. Therefore, the engine is in rotating operation during the engine running with the connecting/disconnecting clutch engaged.

Preferably, the engagement device is implemented by using a wet or dry type engagement device having an engagement state thereof controlled by an actuator. For example, the engagement device may be a known single-plate or multi-plate type hydraulic friction engagement device, an electromagnetic friction engagement device, a magnetic powder clutch, and a single-plate diaphragm dry friction clutch. In other words, the present invention is widely applied to vehicles including an engagement device non-rotatably fixing the engine.

Preferably, the automatic transmission is made up of a known planetary gear type multistage transmission, a synchronous meshing type parallel two-shaft automatic transmission, a belt type continuously variable transmission, etc.

An example of the present invention will now be described in detail with reference to the drawings.

FIRST EXAMPLE

Figure 1:
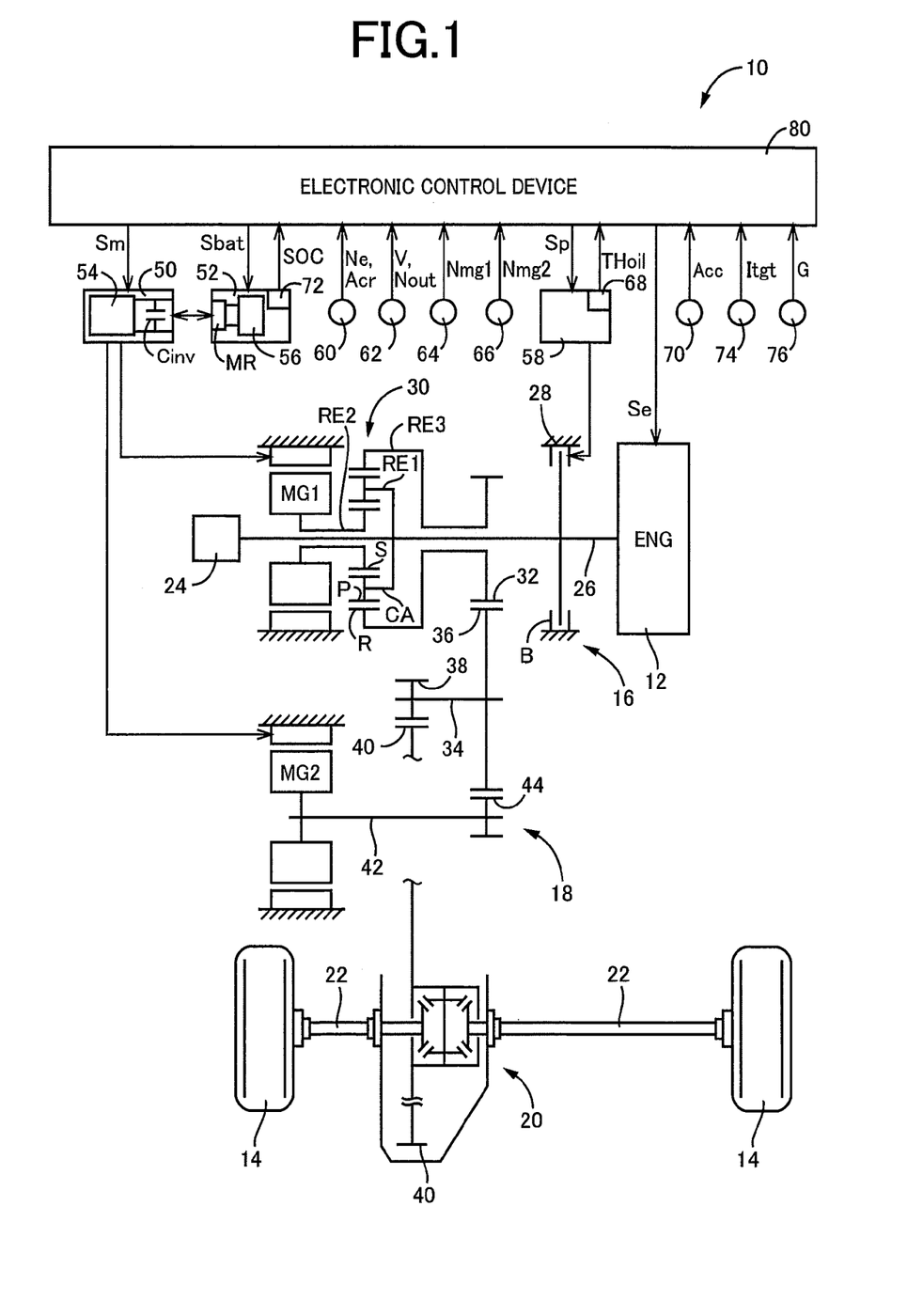
FIG. 1 is a diagram for explaining a general configuration of a vehicle to which the present invention is applied, and is a block diagram for explaining a main portion of a control system disposed in the vehicle.

FIG. 1 is a diagram for explaining a general configuration of a hybrid vehicle 10 (hereinafter referred to as a vehicle 10) to which the present invention is applied, and is a block diagram for explaining a main portion of a control system disposed for controlling the portions of the vehicle 10. In FIG. 1, the vehicle 10 is a vehicle of the FF (front-engine front-drive) type and includes a first drive portion 16, a second drive portion 18, a differential gear device 20, and a pair of left and right axles 22 disposed on a power transmission path between a drive force source for running, i.e., an engine 12, a first electric motor MG1, and a second electric motor MG2, and a pair of left and right drive wheels 14. The vehicle 10 also includes an oil pump 24 rotationally driven by the engine 12 to generate an oil pressure used as an original oil pressure of a hydraulic control circuit 58 and to supply lubrication oil to the first drive portion 16, the second drive portion 18, etc. The vehicle 10 also includes as an engagement device non-rotatably fixing the engine 12 a brake B fixing a crankshaft 26 of the engine 12 to a housing 28 that is a non-rotating member.

The first drive portion 16 includes a planetary gear device 30 having a sun gear S, a carrier CA supporting a pinion gear P in a rotatable and revolvable manner, and a ring gear R meshed with the sun gear S via the pinion gear P, as well as an output gear 32. The planetary gear device 30 is a known single pinion type planetary gear device having the sun gear S that is a rotating element coupled to the first electric motor MG1, the ring gear R that is a rotating element coupled to the drive wheels 14 in a power transmittable manner, and a carrier CA that is a rotating element coupled to the housing 28 by engagement actuation of the brake B, as three rotating elements (rotating members), and acts as a differential mechanism generating a differential action. The carrier CA of the planetary gear device 30 is coupled to the crankshaft 26 of the engine 12 as an input shaft of the first drive portion 16, and the ring gear R of the planetary gear device 30 is coupled to the output gear 32. Therefore, the planetary gear device 30 is a power distribution mechanism including the carrier CA acting as a first rotating element RE1 that is an input rotating member and that is coupled to the engine 12, the sun gear S acting as a second rotating element RE2, and the ring gear R acting as a third rotating element RE3 that is an output rotating member, so as to distribute the power output from the engine 12 to the first electric motor MG1 and the output gear 32, and acts as an electric continuously variable transmission. The output gear 32 is meshed with a large diameter gear 36 disposed integrally with an intermediate output shaft 34 parallel to the crankshaft 26. A small diameter gear 38 disposed integrally with the intermediate output shaft 34 is meshed with a differential input gear 40 of the differential gear device 20.

The second drive portion 18 includes a second output gear 44 coupled to an MG2 output shaft 42 that is an output shaft of the second electric motor MG2. The second output gear 44 is meshed with the large diameter gear 36. As a result, the second electric motor MG2 is coupled to the drive wheels 14 in a power transmittable manner.

Both the first electric motor MG1 and the second electric motor MG2 are electric motors indirectly coupled to the engine 12 via the planetary gear device 30 and are permanent magnet type synchronous motors (PM motors) using a permanent magnet for a rotator (rotor), for example. Although both the first electric motor MG1 and the second electric motor MG2 are motor generators having a function of a motor generating a drive force and a function of a generator (electric generator) generating a reaction force, the first electric motor MG1 at least has the function of a generator and the second electric motor MG2 at least has the function of a motor. Each of the first and second electric motors MG1 and MG2 is connected via an inverter unit 50 to a battery unit 52.

The inverter unit 50 is an electric circuit having an inverter portion 54 controlling giving/receiving of electric power related to respective operations of the first electric motor MG1 and the second electric motor MG2 and an inverter capacitor Cinv acting as an electric storage member temporarily storing the electric power. The inverter portion 54 includes, for example, a known switching element, and the switching operation of the switching element is controlled by a command from an electronic control device 80 described later such that respective output or regenerative torques requested to the first electric motor MG1 and the second electric motor MG2 are acquired. The inverter capacitor Cinv is a smoothing capacitor for smoothing a voltage on the battery unit 52 side of the inverter portion 54, for example. If the inverter unit 50 has a DC/DC converter in an electric path between the inverter portion 54 and the battery unit 52, the inverter capacitor Cinv may include an input capacitor (or filter capacitor) disposed on the battery unit 52 side of the DC/DC converter.

The battery unit 52 includes a battery portion 56 that is a chargeable/dischargeable secondary cell such as a lithium-ion battery pack and a nickel-hydrogen battery pack, for example, and a main relay MR opening/closing an electric path to the inverter unit 50 (i.e., connecting/interrupting the battery portion 56 to/from the inverter unit 50) depending on a command from the electronic control device 80. The battery portion 56 may be a capacitor etc.

In the vehicle 10 configured as described above, the power from the engine 12 in the first drive portion 16 is output via the planetary gear device 30 from the output gear 32 and is transmitted via the large diameter gear 36 and the small diameter gear 38 having the smaller number of gear teeth than the large diameter gear 36 disposed on the intermediate output shaft 34 to the differential input gear 40 of the differential gear device 20. The power from the first electric motor MG1 in the first drive portion 16 can be transmitted via the planetary gear device 30 to the output gear 32 and transmitted via the large diameter gear 36 and the small diameter gear 38 disposed on the intermediate output shaft 34 to the differential input gear 40 of the differential gear device 20. The power from the second electric motor MG2 in the second drive portion 18 is transmitted via the MG2 output shaft 42 and the second output gear 44 to the large diameter gear 36 disposed on the intermediate output shaft 34 and is transmitted via the large diameter gear 36 and the small diameter gear 38 to the differential input gear 40 of the differential gear device 20. Therefore, the vehicle 10 of this example is configured such that any of the engine 12, the first electric motor MG1, and the second electric motor MG2 may be used as the drive force source for running.

The brake B is preferably a wet type friction brake and is a multi-plate type hydraulic friction engagement device subjected to engagement control by a hydraulic actuator, for example. The brake B has an engagement state thereof controlled between engagement and release depending on an oil pressure Pb supplied from the hydraulic control circuit 58. The brake B may be slip-engaged (half-engaged) as needed. In the released state of the brake B, the crankshaft 26 of the engine 12 is made rotatable relative to the housing 28. On the other hand, in the engaged state of the brake B, the crankshaft 26 of the engine 12 is made non-rotatable relative to the housing 28. Therefore, the crankshaft 26 of the engine 12 is fixed (locked) to the housing 28 by the engagement of the brake B.

The vehicle 10 includes the electronic control device 80 as a control device controlling the portions of the vehicle 10. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides vehicle control such as hybrid drive control related to the engine 12, the first electric motor MG1, and the second electric motor MG2 and is configured separately for output control of the engine 12 and output control of the electric motors MG1 and MG2 as needed. The electronic control device 80 is supplied with various signals (e.g., an engine rotation speed Ne and crank angle Acr, an output rotation speed Nout that is a rotation speed of the output gear 32 corresponding to a vehicle speed V, a first electric motor rotation speed Nmg1 and a rotor position of the first electric motor MG1, a second electric motor rotation speed Nmg2 and a rotor position of the second electric motor MG2, a lubrication oil temperature THoil that is temperature of lubrication oil of the first drive portion 16 etc., an accelerator opening degree Acc, a state of charge (charging capacity) SOC of the battery portion 56, information Itgt of an object such as another vehicle and a barrier around the vehicle, and deceleration G acting from the directions of the vehicle 10) based on detection values from sensors (e.g., a crank position sensor 60, an output rotation speed sensor 62, a first electric motor rotation speed sensor 64 such as a resolver, a second electric motor rotation speed sensor 66 such as a resolver, an oil temperature sensor 68, an accelerator opening degree sensor 70, a battery sensor 72, a radar sensor 74, and a plurality of acceleration sensors 76) disposed on the vehicle 10. The electronic control device 80 supplies various command signals (e.g., hybrid control command signals such as an engine control command signal Se and an electric motor control command signal Sm, a hydraulic control command signal Sp, and a power source control command signal Sbat) to devices (e.g., the engine 12, the inverter unit 50, the hydraulic control circuit 58, and the battery unit 52) disposed on the vehicle 10.

Figure 2:
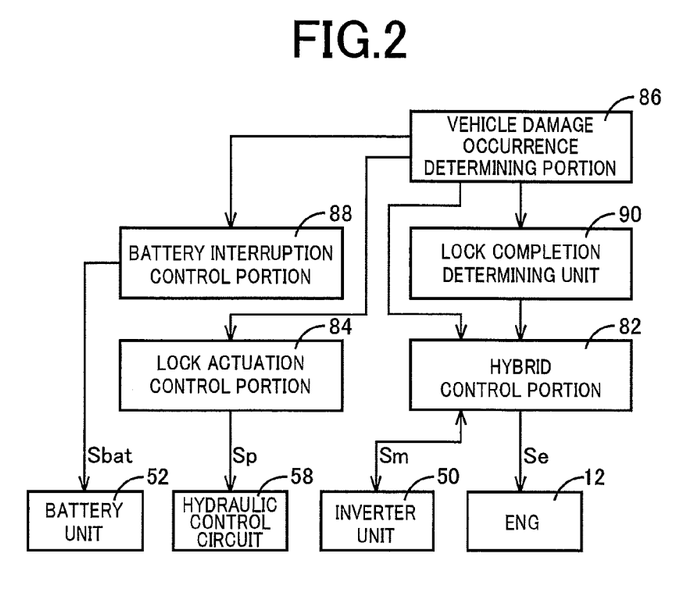
FIG. 2 is a function block diagram for explaining a main portion of the control function of an electronic control device.

FIG. 2 is a function block diagram for explaining a main portion of the control function of the electronic control device 80. In FIG. 2, a hybrid control means, i.e., a hybrid control portion 82 outputs the engine control command signal Se controlling opening/closing of an electronic throttle valve through a throttle actuator for throttle control, controlling a fuel injection amount and injection timing of a fuel injection device for fuel injection control, and controlling ignition timing of an ignition device for ignition timing control, for example, and provides the output control of the engine 12 so as to acquire a target value of an engine torque Te for generating a target engine power Pe*. The hybrid control portion 82 outputs to the inverter portion 54 the electric motor control command signal Sm controlling operation of the first electric motor MG1 and provides the output control of the first electric motor MG1 so as to acquire a target value of a first electric motor torque Tm1. The hybrid control portion 82 outputs to the inverter portion 54 the electric motor control command signal Sm controlling operation of the second electric motor MG2 and provides the output control of the second electric motor MG2 so as to acquire a target value of a second electric motor torque Tmg2.

Specifically, the hybrid control portion 82 calculates a drive torque (request drive torque) requested at the vehicle speed V at a certain time point from the accelerator opening degree Acc and generates the request drive torque from at least one of the engine 12, the first electric motor MG1, and the second electric motor MG2 so as to achieve operation with lower fuel consumption and a smaller exhaust gas amount in consideration of a charging request value (charging request power) etc. For example, the hybrid control portion 82 selectively establishes depending on a running state a motor running mode for motor running (EV running) using at least only one electric motor of the first electric motor MG1 and the second electric motor MG2 as the drive force source for running with operation of the engine 12 stopped, an engine running mode (steady running mode) for engine running using at least the engine 12 as the drive force source for running by accepting a reaction force against the power of the engine 12 with electric generation of the first electric motor MG1 to transmit an engine direct torque to the output gear 32 while the second electric motor MG2 is driven by the generated electric power of the first electric motor MG1 to transmit a torque to the drive wheels 14, and an assist running mode (acceleration running mode) for running with a drive torque of the second electric motor MG2 using electric power from the battery portion 56 further added in the engine running mode. The hybrid control portion 82 preferably establishes the motor running mode in the case of a motor running range in which the request drive torque is smaller than a predefined threshold value, and establishes the engine running mode or the assist running mode in the case of an engine running range in which the request drive torque is equal to or greater than the predefined threshold value.

If the motor running mode is established, the hybrid control portion 82 further determines whether the mode is set to a combination mode in which the first electric motor torque Tmg1 and the second electric motor torque Tmg2 can be used together for running or a single mode in which only the second electric motor torque Tmg2 can be used for running. For example, in the motor running mode, the hybrid control portion 82 establishes the single mode if the request drive torque can be achieved solely by the second electric motor MG2, and establishes the combination mode if the request drive torque cannot be achieved solely by the second electric motor MG2. However, even when the request drive torque can be achieved solely by the second electric motor MG2, if an operating point of the second electric motor MG2 (e.g., an operation point of the second electric motor represented by the second electric motor rotation speed Nmg2 and the second electric motor torque Tmg2) is within a range predefined as operating points deteriorating an efficiency of the second electric motor MG2, or in other words, if higher efficiency is acquired by using the first electric motor MG1 and the second electric motor MG2 together, the hybrid control portion 82 establishes the combination mode.

If the combination mode is established in the motor running mode, the hybrid control portion 82 causes the first electric motor MG1 and the second electric motor MG2 to share the request drive torque based on an operation efficiency of the first electric motor MG1 and the second electric motor MG2. For example, during the motor running in the combination mode, the hybrid control portion 82 obtains a fuel efficiency oriented torque sharing rate predefined based on the request drive torque at the vehicle speed V at a certain time point and obtains respective sharing torques of the first electric motor MG1 and the second electric motor MG2 for the request drive torque based on the sharing rate. The hybrid control portion 82 controls the first electric motor MG1 and the second electric motor MG2 to output the sharing torques so that the motor running is performed.

A lock actuation control means, i.e., a lock actuation control portion 84 controls the actuation of the brake B. Specifically, the lock actuation control portion 84 controls the oil pressure Pb supplied from the hydraulic control circuit 58 to the hydraulic actuator of the brake B to control the engagement or release of the brake B, i.e., fixation (fixation to the housing 28), or release of the fixation, of the crankshaft 26 of the engine 12. For example, if the hybrid control portion 82 establishes the combination mode in the motor running mode, the lock actuation control portion 84 increases the oil pressure Pb supplied from the hydraulic control circuit 58 to the brake B to engage the brake B, thereby fixing the crankshaft 26 of the engine 12 to the housing 28. If the hybrid control portion 82 establishes the engine running mode or the assist running mode or establishes the single mode in the motor running mode, the lock actuation control portion 84 reduces the oil pressure Pb supplied from the hydraulic control circuit 58 to the brake B to release the brake B, thereby releasing the fixation of the crankshaft 26 to the housing 28.

Figure 3:
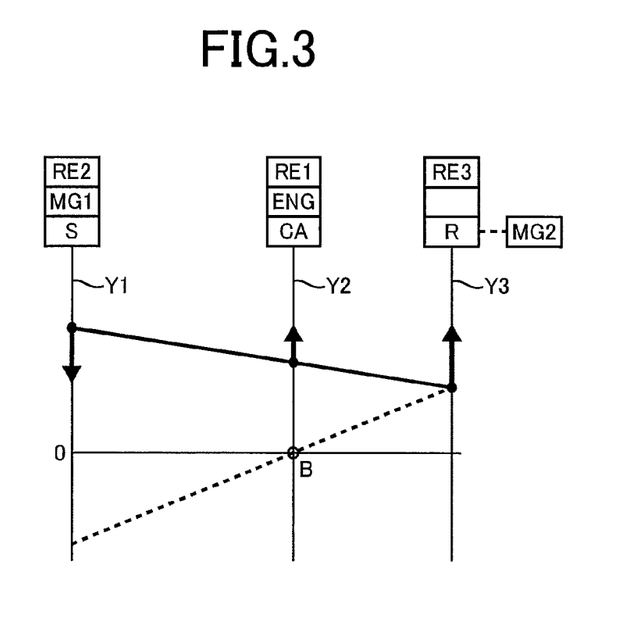
FIG. 3 is a collinear diagram capable of relatively representing rotation speeds of rotating elements in a planetary gear device, and the collinear diagram representing a running state when a brake is released.
Figure 4:
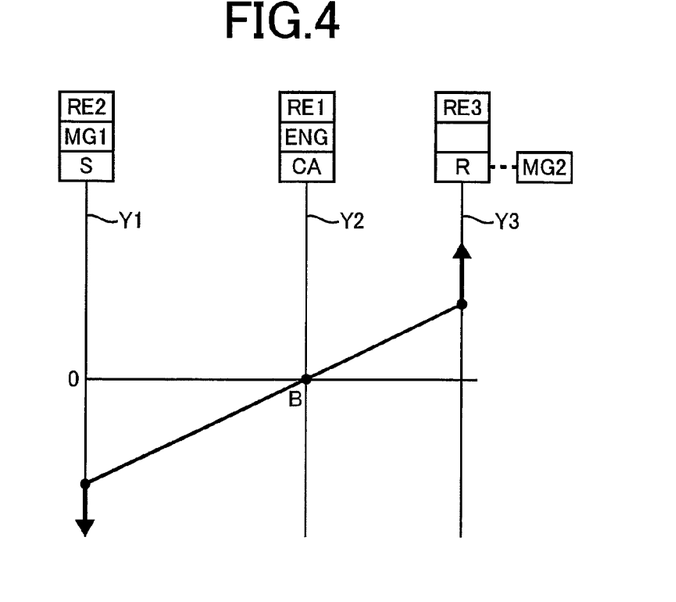
FIG. 4 is a collinear diagram capable of relatively representing rotation speeds of rotating elements in a planetary gear device, and the collinear diagram representing a running state when a brake is engaged.

FIGS. 3 and 4 are collinear diagrams capable of relatively representing rotation speeds of the three rotating elements in the planetary gear device 30 and, with regard to vertical lines Y1 to Y3, from left to right on the planes of FIGS. 3 and 4, the vertical line Y1 indicates the rotation speed of the sun gear S that is the second rotating element RE2 coupled to the first electric motor MG1; the vertical line Y2 indicates the rotation speed of the carrier CA that is the first rotating element RE 1 coupled to the engine 12; and the vertical line Y3indicates the rotation speed of the ring gear R that is the third rotating element RE3 coupled to the second electric motor MG2 via the large diameter gear 36, the second output gear 44, etc. FIG. 3 represents the relative speeds of the rotating elements in a running state when the brake B is released and FIG. 4 represents the relative speeds of the rotating elements in a running state when the brake B is engaged.

Describing an operation of the vehicle 10 in the engine running mode or the assist running mode by using a solid line of FIG. 3, when the reaction torque from the first electric motor MG1 is input to the sun gear S for the engine torque Te input to the carrier CA, the first electric motor MG1 is caused to act as an electric generator. If the rotation speed of the ring gear R (the output rotation speed Nout) is constant, the engine rotation speed Ne can be varied continuously (in a stepless manner) by changing the first electric motor rotation speed Nmg1 up and down. Therefore, for example, control of setting an operating point of the engine 12 (e.g., an operation point of the engine 12 represented by the engine rotation speed Ne and the engine torque Te) to the operating point with the best fuel efficiency can be provided through power running control or reaction force control of the first electric motor MG1. This kind of hybrid format is referred to as a mechanical distribution type or a split type. Describing the operation of the vehicle 10 in the single mode in the motor running mode by using a broken line of FIG. 3, driving of the engine 12 is not performed and the rotation speed thereof is set to zero. In this state, power running torque of the second electric motor MG2 is transmitted as a drive force in the vehicle forward direction to the drive wheels 14. The first electric motor MG1 is put into a no-load state (made free).

Describing the operation of the vehicle 10 in the combination mode in the motor running mode with reference to FIG. 4, the drive of the engine 12 is not performed (i.e., the engine 12 is put into an operation stop state) and the rotation speed thereof is set to zero. The brake B is actuated for engagement by the lock actuation control portion 84 through the hydraulic control circuit 58 to fix the crankshaft 26 to the housing 28 and rotation of the engine 12 is locked. In the engaged state of the brake B, the power running torque of the second electric motor MG2 is transmitted as a drive force in the vehicle forward direction to the drive wheels 14. The reaction torque of the first electric motor MG1 is transmitted as a drive force in the vehicle forward direction to the drive wheels 14. As a result, the rotation speed of the ring gear R is raised in the positive direction by the reaction torque of the first electric motor MG1. Therefore, when the crankshaft 26 of the engine 12 is locked by the brake B, the vehicle 10 can use the first electric motor MG1 and the second electric motor MG2 together as the drive force source for running. As a result, for example, if the battery portion 56 is increased in capacity (increased in output power) in a so-called plug-in hybrid vehicle etc. having the battery portion 56 chargeable from a household power source, etc., higher output of the motor running can be realized while the second electric motor MG2 is restrained from increasing in size.

For example, if an ignition switch is turned off in the vehicle 10 of this example, the main relay MR is opened (turned off) by the power source control command signal Sbat from the electronic control device 80 and the battery portion 56 is interrupted from the inverter unit 50. As a result, no electric charge is further stored in the inverter capacitor Cinv and, therefore, the electric charge accumulated until this time point is discharged by a discharging resistor not depicted disposed in parallel with the inverter capacitor Cinv, for example.

On the other hand, since the battery portion 56 and the inverter capacitor Cinv have high voltage, it is desirable in the case of damage of the vehicle 10 that the voltage of the battery portion 56 is not applied to an electric path on the outside of the battery unit 52 and that the electric charge left in the inverter capacitor Cinv is promptly discharged. Therefore, in the case of damage of the vehicle 10, the electronic control device 80 outputs the power source control command signal Sbat for turning off the main relay MR. The electronic control device 80 outputs to the inverter portion 54 the electric motor control command signal Sm for providing capacitor discharge control in which the electric charge of the inverter capacitor Cinv is discharged by controlling the switching operation of the switching element, thereby discharging the electric charge left in the inverter capacitor Cinv (i.e., discharging the electric power stored in the inverter capacitor Cinv) more promptly as compared to the discharge by the discharging resistor. The capacitor discharge control is provided by controlling the direction of a vector of the magnetic field formed by a permanent magnet (field magnet) disposed on the rotor of the electric motor MG (the first electric motor MG1 and the second electric motor MG2) and the direction of a vector of a discharge current so as not to generate a force in the direction of the vector of the force. In other words, the capacitor discharge control is provided by controlling the switching operation of the switching element in the inverter portion 54 so as to operate the electric motor MG at the field angle of the electric motor MG such that the electric power is consumed without generating a torque in the electric motor MG.

If the vehicle 10 is damaged during the engine running (see the solid line of FIG. 3), the engine 12 is rotating and inertia energy is present in the engine 12 as compared to during the motor running (see the broken line of FIG. 3 and the solid line of FIG. 4). Therefore, even if fuel cut is performed for the engine 12 in the case of damage of the vehicle 10, the engine rotation speed Ne does not immediately decrease. Therefore, the electric motor MG continues generating electricity and a longer time is required for discharging the electric charge left in the inverter capacitor Cinv. Additionally, if it is attempted to consume the inertia energy of the engine 12 by the electric motor MG and the inverter portion 54, this may increase heat generation in the electric motor MG and the inverter portion 54, for example. Therefore, if electricity is discharged with the heat generation suppressed, a longer time may be required for completing the discharge.

Therefore, if the vehicle 10 is damaged or if a damage of the vehicle 10 is predicted (i.e., in the case of damage of the vehicle 10) during the rotating operation of the engine 12 (i.e., during the engine running), the electronic control device 80 of this example reduces the engine rotation speed Ne through the engagement actuation of the brake B. In particular, the inertia energy of the engine 12 is consumed by the engagement actuation of the brake B to more promptly reduce the engine rotation speed Ne as compared to a passive reduction of the engine rotation speed Ne through the fuel cut of the engine 12. After the engine rotation speed Ne is reduced, the electronic control device 80 provides the capacitor discharge control through the electric motor MG and the inverter unit 50 (particularly, the inverter portion 54) to discharge the electric charge left in the inverter capacitor Cinv. As a result, the inertia energy of the engine 12 to be consumed by the electric motor MG and the inverter portion 54 is reduced and the discharge time of the inverter capacitor Cinv can be shortened.

More preferably, the inertia energy of the engine 12 is substantially entirely consumed by the engagement actuation of the brake B to substantially eliminate the need for consuming the inertia energy of the engine 12 by the electric motor MG and the inverter portion 54. In particular, after the engine 12 is non-rotatably fixed by the engagement of the brake B, the electronic control device 80 provides the capacity discharge control to discharge the electric charge left in the inverter capacitor Cinv. As a result, the discharge time of the inverter capacitor Cinv can further be shortened.

In this case, since the electric motor MG may still be rotating even if the engine 12 is non-rotatably fixed by the engagement of the brake B as depicted in FIG. 4, the electronic control device 80 outputs to the inverter portion 54 the electric motor control command signal Sm for providing electric motor stop control in which a regenerative operation of the electric motor MG is performed to stop rotation of the electric motor MG; in addition to the capacitor discharge control. The electric motor stop control and the capacitor discharge control are provided by controlling the field angel of the electric motor MG such that the electric motor MG is on a regenerative and power-consuming side. In particular, the electric motor stop control and the capacitor discharge control are provided by controlling the switching operation of the switching element in the inverter portion 54 so as to operate the electric motor MG at the field angle of the electric motor MG such that while the regenerative operation is performed through the electric motor stop control, the consumed power through the capacitor discharge control exceeds the electric power generated by the regenerative operation. As a result, a reduction in rotation speed, or termination of rotation, of the electric motor MG can be achieved concurrently with the discharge of the electric charge of the inverter capacitor Cinv.

More specifically, returning to FIG. 2, a vehicle damage occurrence determining means, i.e., a vehicle damage occurrence determining portion 86 determines occurrence of damage of the vehicle 10 based on whether the vehicle 10 is damaged (e.g., has a collision) or based on whether a damage (e.g., collision) of the vehicle 10 is predicted. For example, the vehicle damage occurrence determining portion 86 determines whether the vehicle 10 is damaged based on whether the deceleration G (longitudinal deceleration or lateral deceleration) detected by the acceleration sensors 76 reaches a damage determination value obtained and stored in advance as a change in the deceleration G sufficient for determining that the vehicle 10 is damaged. The vehicle damage occurrence determining portion 86 determines whether a damage of the vehicle 10 is inevitable from predetermined criteria obtained and stored in advance (i.e., predicts a damage of the vehicle 10), based on the information Itgt of an object around the vehicle detected by the radar sensor 74, for example, based on the position, speed, course, etc., of the object.

If the vehicle damage occurrence determining portion 86 determines the occurrence of damage of the vehicle 10, the hybrid control portion 82 outputs to an engine output control device such as a fuel injection device and an ignition device the engine control command signal Se for stopping fuel supply to the engine 12 and turning off an ignition signal to perform the fuel cut of the engine 12. If the vehicle damage occurrence determining portion 86 determines the occurrence of damage of the vehicle 10, the lock actuation control portion 84 outputs to the hydraulic control circuit 58 the hydraulic control command signal Sp for engaging the brake B in accordance with a predefined rule to fix the crankshaft 26 of the engine 12 to the housing 28. If the vehicle damage occurrence determining portion 86 determines the occurrence of damage of the vehicle 10, a battery interruption control means, i.e., a battery interruption control portion 88 outputs to the battery unit 52 the power source control command signal Sbat for turning off the main relay MR to disconnect the battery portion 56 from the inverter unit 50.

A lock completion determining means, i.e., a lock completion determining unit 90 determines whether the rotation of the crankshaft 26 is stopped when the brake B is engaged by the lock actuation control portion 84. For example, the lock completion determining unit 90 determines whether rotation of the crankshaft 26 is stopped based on whether the engine rotation speed Ne reaches a zero determination value predefined such that the speed can be determined as zero.

If the lock completion determining unit 90 determines that a rotation speed of the crankshaft 26 is stopped, the hybrid control portion 82 outputs to the inverter portion 54 the electric motor control command signal Sm for providing the electric motor stop control and the capacitor discharge control.

Figure 5:
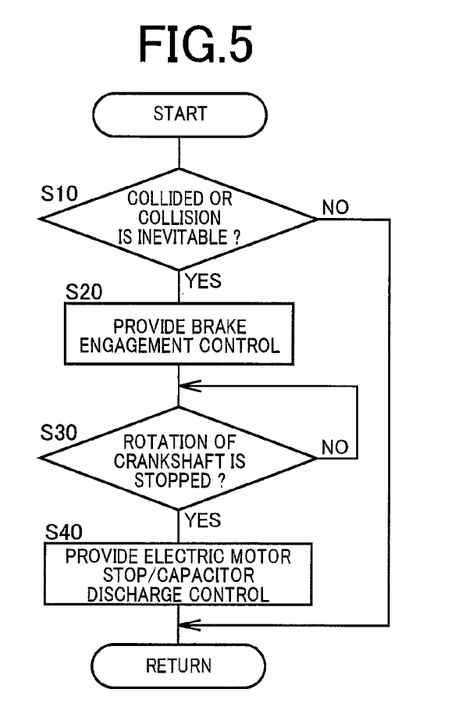
FIG. 5 is a flowchart for explaining a main portion of the control operation of the electronic control device, i.e., the control operation for shortening the discharge time of an inverter capacitor in the case of damage of the vehicle during rotating operation of the engine.

FIG. 5 is a flowchart for explaining a main portion of the control operation of the electronic control device 80, i.e., the control operation for shortening the discharge time of the inverter capacitor Cinv in the case of damage of the vehicle 10 during rotating operation of the engine 12, and is repeatedly executed with an extremely short cycle time, for example, on the order of a few msec to a few tens of msec. The flowchart of FIG. 5 is based on the assumption of the engine running FIG. 6 is a time chart when the control operation depicted in the flowchart of FIG. 5 is executed.

In FIG. 5, first, at step (hereinafter, step will be omitted) S10 corresponding to the vehicle damage occurrence determining portion 86, for example, it is determined whether the vehicle 10 is damaged (e.g., has a collision). Alternatively, it is determined whether a damage (e.g., collision) of the vehicle 10 is predicted. If the determination of S10 is negative, this routine is terminated and, if affirmative, at S20 corresponding to the hybrid control portion 82, the lock actuation control portion 84, and the battery interruption control portion 88, for example, the engine control command signal Se for performing the fuel cut of the engine 12 is output to the engine output control device and the hydraulic control command signal Sp for engaging the brake B is output to the hydraulic control circuit 58 to control the engine 12 toward a stop of rotation. The power source control command signal Sbat for turning off the main relay MR is output to the battery unit 52 (time t1 of FIG. 6). While the engine 12 is controlled toward a stop of rotation by the engagement of the brake B, for example, the electric motor MG may also be put into a no-load state (time t1 to time t3 of FIG. 6). At S30 corresponding to the lock completion determining unit 90, for example, it is determined whether the rotation of the crankshaft 26 (i.e., the engine 12) is stopped. If the determination of S30 is negative, S30 is repeatedly executed and, if affirmative, at S40 corresponding to the hybrid control portion 82, for example, the electric motor control command signal Sm for providing the electric motor stop control and the capacitor discharge control is output to the inverter portion 54 (time t3 of FIG. 6). The electric motor stop control and the capacitor discharge control are provided until, for example, the voltage of the inverter capacitor Cinv becomes equal to or less than a predetermined voltage Vdc defined in advance (time t3 to time t4 of FIG. 6). If electric charge is left in the inverter capacitor Cinv after completion of the electric motor stop control and the capacitor discharge control, the electric charge is discharged by the discharging resistor not depicted, for example.

Figure 6:
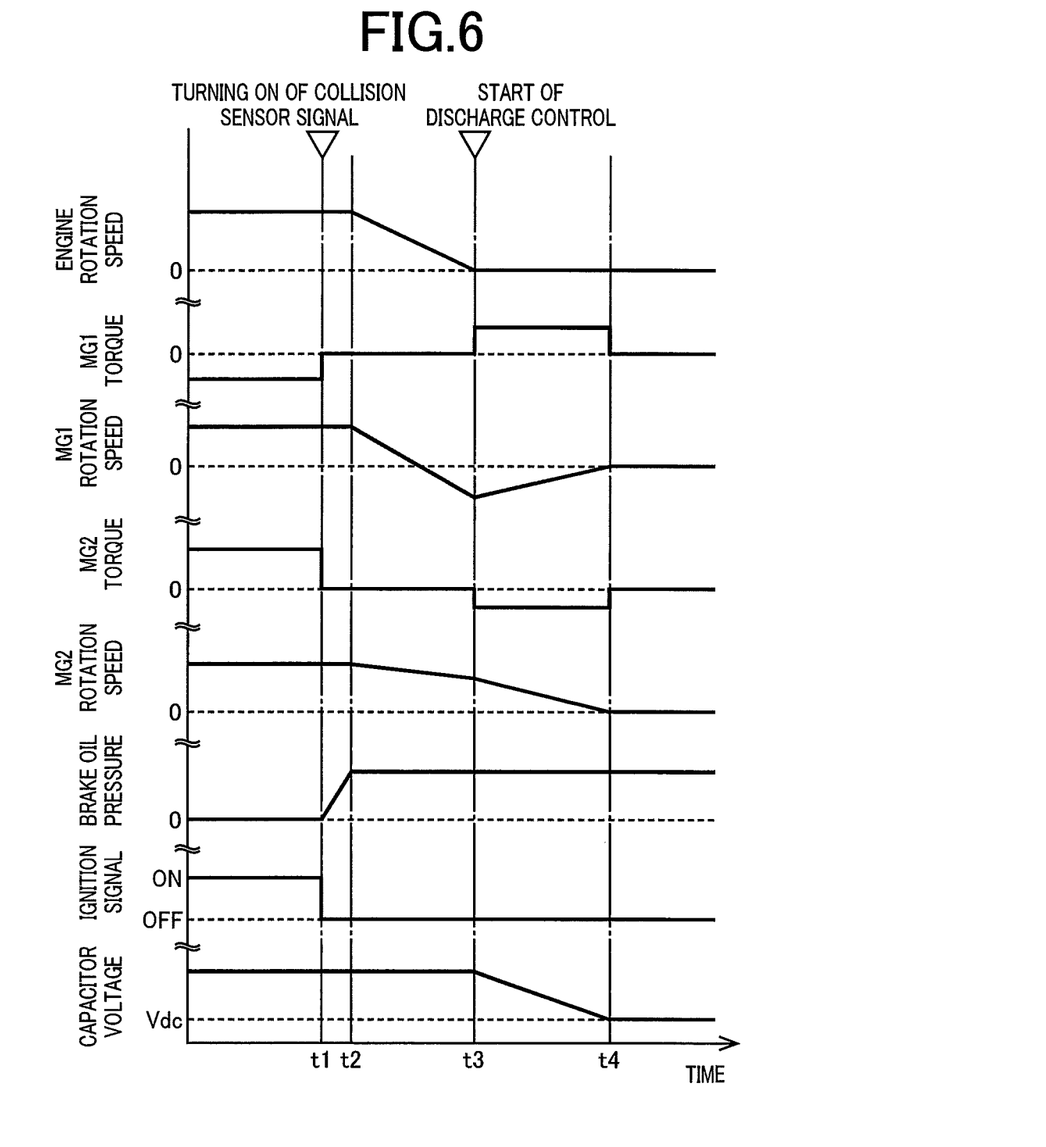
FIG. 6 is a time chart when the control operation depicted in the flowchart of FIG. 5 is executed.

Although the electric motor stop control and the capacitor discharge control are provided after the rotation of the engine 12 is stopped by the engagement of the brake B in the example of FIGS. 5 and 6, the rotation of the engine 12 is not necessarily stopped by the engagement of the brake B. For example, the electric motor stop control and the capacitor discharge control may be provided after the engine rotation speed Ne is reduced to some extent by controlling the brake B toward engagement. In this case, at S30, for example, it is determined whether the engine rotation speed Ne is reduced to be equal to or less than a predetermined rotation speed.

As described above, according to this example, if the vehicle 10 is damaged or if a damage of the vehicle 10 is predicted during the rotating operation of the engine 12, the engine rotation speed Ne is reduced by the engagement actuation of the brake B. As a result, in the case of damage of the vehicle 10, the inertia energy of the engine 12 is consumed by the engagement actuation of the brake B and, therefore, the engine rotation speed Ne can be reduced earlier as compared to when the engine rotation speed Ne is passively reduced by performing fuel cut of the engine 12. Therefore, the electric generation of the electric motor MG can further be suppressed and the discharge time of the inverter capacitor Cinv can be shortened in the case of damage of the vehicle 10 during the rotating operation of the engine 12.

According to this example, after the engine rotation speed Ne is reduced, the electric power stored in the inverter capacitor Cinv is discharged by the inverter unit 50 (inverter portion 54) and the electric motor MG (the first electric motor MG1, the second electric motor MG2). As a result, since the inertia energy of the engine 12 is consumed by the engagement actuation of the brake B, the inertia energy of the engine 12 to be consumed by a heavy current system (the electric motor MG the inverter portion 54) is accordingly reduced and, therefore, the heat generation of the heavy current system is suppressed and the discharge time of the inverter capacitor Cinv can be shortened.

According to this example, after the engine 12 is non-rotatably fixed by the engagement of the brake B, the electric power stored in the inverter capacitor Cinv is discharged. Since this eliminates the need for consuming the inertia energy of the engine 12 by the heavy current system, the discharge time of the inverter capacitor Cinv can further be shortened.

Other examples of the present invention will be described. In the following description, the portions mutually common to the examples are denoted by the same reference numerals and will not be described.

SECOND EXAMPLE

Figure 7:
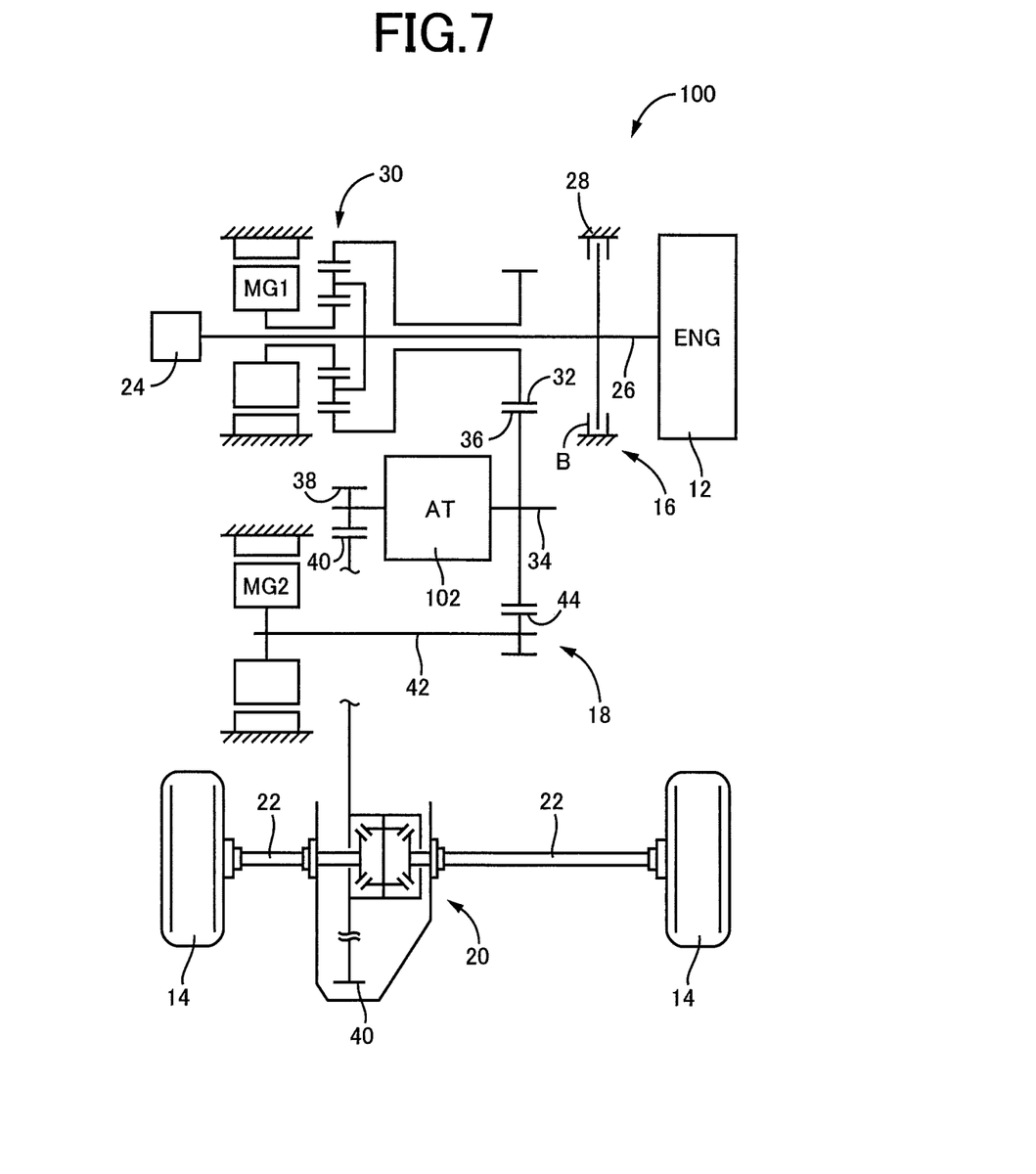
FIG. 7 is a diagram for explaining a general configuration of another vehicle to which the present invention is applied.

FIG. 7 is a diagram for explaining a general configuration of a hybrid vehicle 100 (hereinafter referred to as a vehicle 100) that is another vehicle to which the present invention is applied. The vehicle 100 depicted in FIG. 7 is mainly different from the vehicle 10 depicted in FIG. 1 in that the vehicle 100 further includes an automatic transmission 102 making up a portion of a power transmission path between the second electric motor MG2 and the drive wheels 14. The automatic transmission 102 is a known planetary gear type multistage transmission including a plurality of planetary gear devices, and a plurality of hydraulic friction engagement devices, for example. In the automatic transmission 102, each of the hydraulic friction engagement devices is engaged or released by operating oil from the hydraulic control circuit 58 in accordance with a predetermined engagement operation table so as to achieve a gear stage determined from a known relationship (shift diagram, shift map) having upshift lines and downshift lines defined and stored in advance, for example. As a result, in the automatic transmission 102, a plurality of gear stages having respective different gear ratios γ of the automatic transmission 102 is established in an alternative manner depending on a driver's accelerator operation, the vehicle speed V, etc.

As described in the example, even if the engine rotation speed Ne is reduced by the engagement actuation of the brake B in the case of damage of the vehicle 100 during the engine running, the electric motor MG may still be rotating (see FIG. 4). In this regard, in the example, the electric motor stop control is provided in addition to the capacitor discharge control. In this example, instead of, or in addition to, controlling the rotation of the electric motor MG toward a stop through the electric motor stop control, the rotation speed of the electric motor MG is reduced by generating a tie-up increasing a rotation load of a rotating member of the automatic transmission 102 in the case of damage of the vehicle 100. As a result, while the inertia energy of the engine 12 is consumed by the engagement actuation of the brake B, the inertia energy of the electric motor MG is additionally consumed by the tie-up of the automatic transmission 120. Therefore, since the electric power generated by the regenerative operation of the electric motor MG is suppressed, the electric charge left in the inverter capacitor Cinv can more promptly be discharged.

Specifically, if the vehicle damage occurrence determining portion 86 determines the occurrence of damage of the vehicle 10, the lock actuation control portion 84 outputs to the hydraulic control circuit 58 the hydraulic control command signal Sp for engaging the brake B as well as the hydraulic control command signal Sp for maintaining engagement of a hydraulic friction engagement device A for forming a current gear stage of the automatic transmission 102 and controlling a hydraulic friction engagement device B different from the hydraulic friction engagement device A toward engagement so as to fix the crankshaft 26 of the engine 12 to the housing 28 and to tie up the automatic transmission 102. This tie-up may stop rotation of a rotating member making up the automatic transmission 102 (e.g., a rotating element of the planetary gear device) (i.e. may lock a rotating operation of inside of the automatic transmission 102) or may reduce a rotation speed of the rotating member.

As described above, according to this example, the same effect as the example can be acquired. Additionally, according to this example, in the case of damage of the vehicle 100, the tie-up of the automatic transmission 102 is generated to reduce the rotation speed of the electric motor MG. Therefore, since the inertia energy of the engine 12 is consumed by the engagement actuation of the brake B and the inertia energy of the electric motor MG is additionally consumed by the tie-up of the automatic transmission 102, the engine rotation speed Ne and the rotation speed of the electric motor MG are reduced early. As a result, in the case of damage of the vehicle 100 during the rotating operation of the engine 12, the discharge time of the inverter capacitor Cinv can further be shortened. Particularly, for the vehicle 100 having the engine 12 and the electric motor MG coupled indirectly via the planetary gear device 30, it is useful to consume the inertia energy of the electric motor MG by the tie-up of the automatic transmission 102.

THIRD EXAMPLE

Figure 8A:
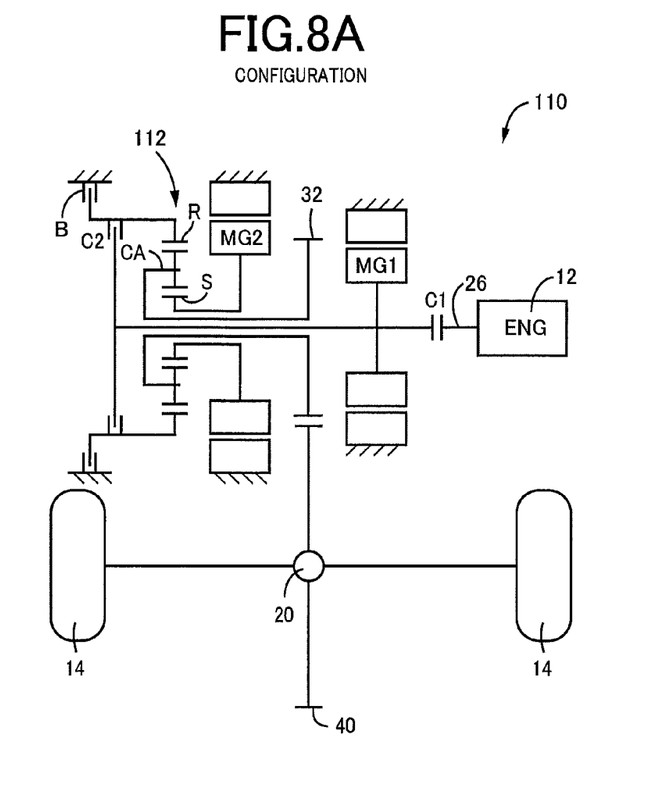
FIG. 8 is a diagram for explaining another vehicle to which the present invention is applied and (a) is a general configuration diagram while (b) is a diagram for explaining various running modes.
Figure 8B:
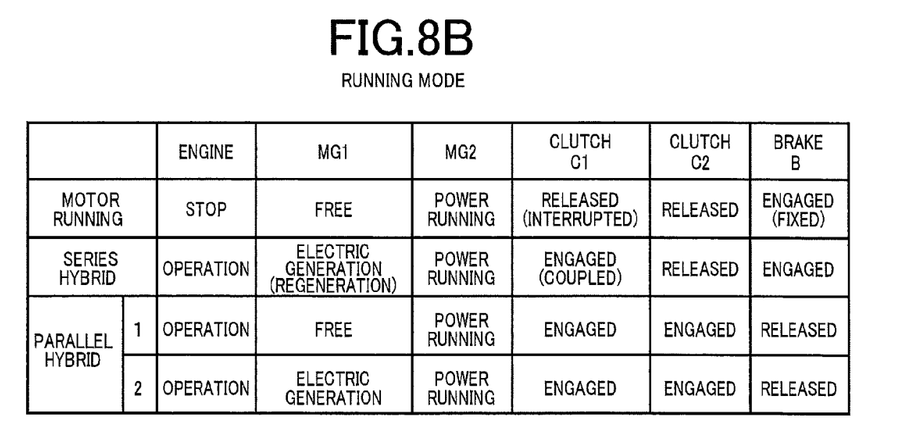

FIG. 8 is a diagram for explaining a hybrid vehicle 110 (hereinafter referred to as a vehicle 110) that is another vehicle to which the present invention is applied and (a) is a general configuration diagram while (b) is a diagram for explaining various running modes. As depicted in FIG. 8(a), although the vehicle 110 includes a planetary gear device 112 as is the case with the vehicle 10, a coupling relationship of the engine 12, the first electric motor MG1, and the second electric motor MG2 to the planetary gear device 112 is different from the vehicle 10. In particular, the engine 12 and the first electric motor MG1 are coupled indirectly via a clutch C1 and are also coupled to the same rotating element (ring gear R) of the planetary gear device 112. As depicted in FIG. 8(b), the vehicle 110 can achieve a motor running mode, a series hybrid running mode, and a parallel hybrid running mode. In this example, the clutch C1, a clutch C2, and the brake B correspond to an engagement device non-rotatably fixing the engine. In the series hybrid running mode, the engine 12 is in operation only for the electric generation of the first electric motor MG1 and the engine 12 does not act as a drive force source for running such that the engine torque is mechanically transmitted to the drive wheels 14; however, the engine 12 is still in the rotating operation as is the case with the parallel hybrid running mode. Therefore, although it is described in the first and second examples that the engine 12 is in the rotating operation during the engine running, the engine 12 may be at least in operation as in the case of the series hybrid running mode.

Since the vehicle 110 configured as depicted in FIG. 8 is a vehicle including the engine 12, the electric motor MG coupled to the engine 12, and the engagement device non-rotatably fixing the engine 12 as is the case with the vehicle 10 and the control is applicable that reduces the engine rotation speed Ne by the engagement actuation of the engagement device in the case of damage of the vehicle 110 during the rotating operation of the engine 12, substantially the same effect as the first example can also be acquired in this example.

FOURTH EXAMPLE

Figure 9:
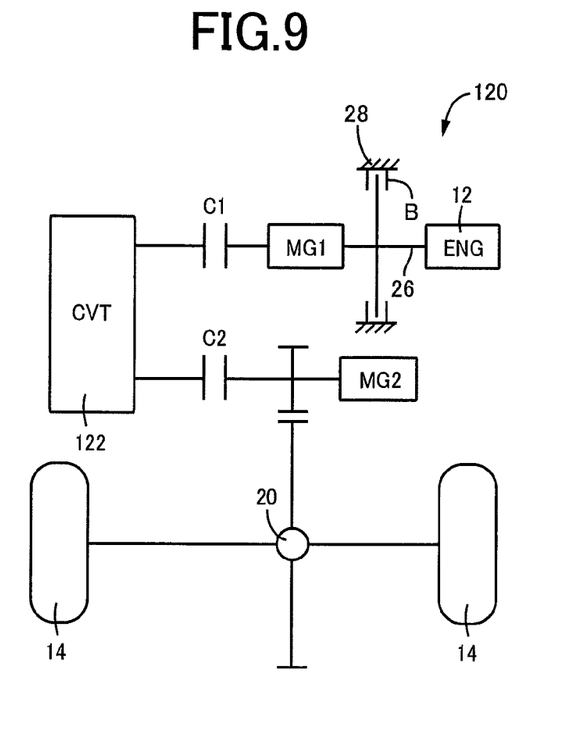
FIG. 9 is a diagram for explaining a general configuration of another vehicle to which the present invention is applied.

FIG. 9 is a diagram for explaining a general configuration of a hybrid vehicle 120 (hereinafter referred to as a vehicle 120) that is another vehicle to which the present invention is applied. As depicted in FIG. 9, the engine 12 and the first electric motor MG1 are directly coupled in the vehicle 120. The power of the engine 12 is transmitted via a belt type continuously variable transmission 122 toward the drive wheels 14.

Since the vehicle 120 configured as depicted in FIG. 9 is a vehicle including the engine 12, the first electric motor MG1 coupled to the engine 12, and the brake B non-rotatably fixing the engine 12 as is the case with the vehicle 10 and the control is applicable that reduces the engine rotation speed Ne by the engagement actuation of the brake B in the case of damage of the vehicle 120 during the rotating operation of the engine 12, substantially the same effect as the first example can also be acquired in this example.

FIFTH EXAMPLE

Figure 10:
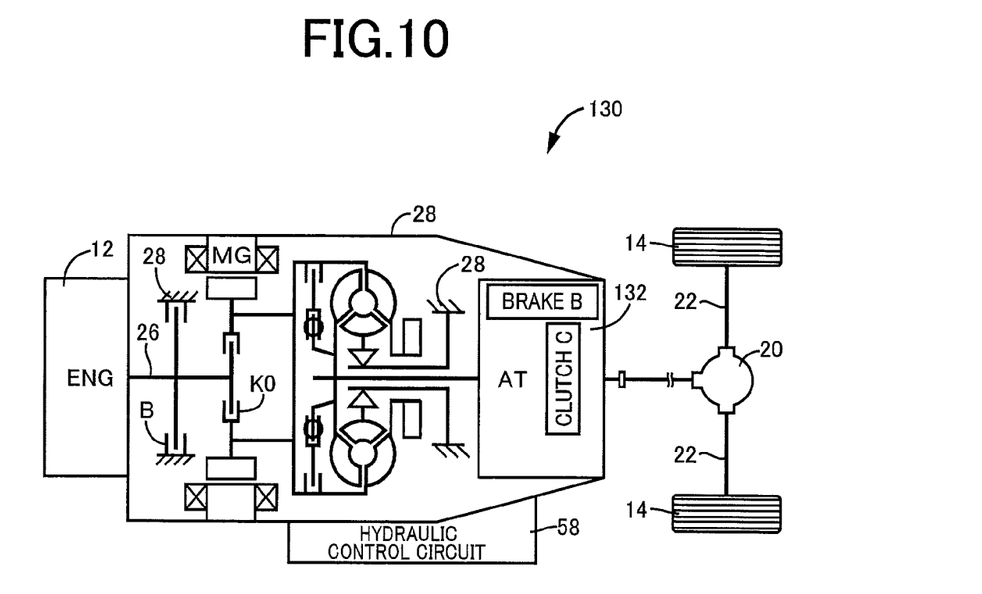
FIG. 10 is a diagram for explaining a general configuration of another vehicle to which the present invention is applied.

FIG. 10 is a diagram for explaining a general configuration of a hybrid vehicle 130 (hereinafter referred to as a vehicle 130) that is another vehicle to which the present invention is applied. As depicted in FIG. 10, the engine 12 and the electric motor MG are connected indirectly via a clutch K0 in the vehicle 130. The vehicle 130 includes an automatic transmission 132 making up a portion of a power transmission path between the electric motor MG and the drive wheels 14. The vehicle 130 can perform the motor running for running by using the electric motor MG with the clutch k0 released and the engine running for running by using at least the engine 12 with the clutch engaged.

Since the vehicle 130 configured as depicted in FIG. 10 is a vehicle including the engine 12, the electric motor MG coupled to the engine 12, and the brake B non-rotatably fixing the engine 12 as is the case with the vehicle 10 and the control is applicable that reduces the engine rotation speed Ne by the engagement actuation of the brake B in the case of damage of the vehicle 130 during the rotating operation of the engine 12 (during the engine running with the clutch KO engaged), substantially the same effect as the first example can also be acquired in this example. Additionally, since the vehicle 130 configured as depicted in FIG. 10 is a vehicle further including the automatic transmission 132 making up a portion of the power transmission path between the electric motor MG and the drive wheels 14 as is the case with the vehicle 100 and the control is applicable that generates a tie-up increasing rotation load of the rotating member of the automatic transmission 132 to reduce the rotation speed of the electric motor MG in the case of damage of the vehicle 130, substantially the same effect as the second example can also be acquired in this example.

Although the examples of the present invention have been described in detail with reference to the drawings, the present invention is also applied in other forms.

For example, the first and second examples can be implemented by combining the examples with each other.

Although the electric motor stop control and the capacitor discharge control are provided in the same period in the examples, the electric motor stop control and the capacitor discharge control may sequentially be provided or may be provided such that the controls overlap to some extent.

Although the engagement device is exemplarily illustrated as the brake B in the examples, this is not a limitation. For example, the engagement device may be a clutch selectively coupling the housing 28 and the crankshaft 26.

In the examples, the second electric motor MG2 may be coupled to the output gear 32, the intermediate output shaft 34, the drive wheels 14, etc. directly or indirectly via a gear mechanism etc., or may directly or indirectly be coupled to a pair of wheels different from the drive wheels 14. If the second electric motor MG2 is coupled to a pair of different wheels, the pair of the different wheels is also included in the drive wheels. In short, the drive wheels driven by the power from the engine 12 may be wheels different from the drive wheels driven by the power from the second electric motor MG2.

Although the planetary gear devices 30 and 112 are single-planetary planetary gear devices in the examples, the planetary gear devices 30 and 112 may be double-planetary planetary gear devices. The planetary gear devices 30 and 112 may be any differential mechanism and may be, for example, differential gear devices having a pair of bevel gears meshed with a pinion.

The above description is merely an embodiment and the present invention can be implemented in variously modified and improved forms based on the knowledge of those skilled in the art.

NOMENCLATURE OF ELEMENTS 10, 100, 110, 120, 130: hybrid vehicle (vehicle)
12: engine
14: drive wheels
50: inverter unit (electric circuit)
80: electronic control device (control device)
102, 132: automatic transmission
B: brake (engagement device)
C1, C2: clutch (engagement device)
Cinv: inverter capacitor (electric storage member)
MG: electric motor
MG1: first electric motor (electric motor)
MG2: second electric motor (electric motor)

The invention claimed is:

1. A control device of a vehicle including an engine, an electric motor directly or indirectly coupled to the engine, a non-rotating member, and an engagement device selectively coupling a crankshaft of the engine to the non-rotating member,
   the vehicle further including an electric circuit controlling transmission of electric power related to operation of the electric motor and having an electric storage member temporarily storing the electric power,
   if the vehicle is damaged, or if a damage of the vehicle is predicted, during rotating operation of the engine, a rotation speed of the engine being reduced by an engagement actuation of the engagement device, and
   after the rotation speed of the engine is reduced to be equal to or less than a predetermined rotation speed, electric power stored in the electric storage member being discharged by the electric circuit and the electric motor.

2. The control device of a vehicle of claim 1, wherein
after the crankshaft of the engine is coupled to the non-rotating member by engagement of the engagement device, the electric power stored in the electric storage member is discharged.

3. The control device of a vehicle of claim 1, wherein
the vehicle further includes an automatic transmission making up a portion of a power transmission path between the electric motor and drive wheels, and wherein
if the vehicle is damaged or if a damage of the vehicle is predicted, a tie-up increasing a rotation load of a rotating member of the automatic transmission is generated to reduce rotation speed of the electric motor.

4. A control device of a vehicle including an engine, an electric motor directly or indirectly coupled to the engine, a non-rotating member, and an engagement device selectively coupling a crankshaft of the engine to the non-rotating member,
   the vehicle further including an automatic transmission making up a portion of a power transmission path between the electric motor and drive wheels, and
   if the vehicle is damaged, or if a damage of the vehicle is predicted, during rotating operation of the engine, a rotation speed of the engine being reduced by an engagement actuation of the engagement device, and a tie-up increasing a rotation load of a rotating member of the automatic transmission being generated to reduce a rotation speed of the electric motor.

* * * * *